(12) United States Patent
Willoughby et al.

(10) Patent No.: US 12,436,874 B1
(45) Date of Patent: Oct. 7, 2025

(54) COMPUTER SYSTEM TEST PARALLELIZATION

(71) Applicant: International Business Machines Corporation, Armonk, NY (US)

(72) Inventors: Jeffrey Willoughby, Poughkeepsie, NY (US); Milcah Ntende, Poughkeepsie, NY (US); Donald Thomas, Hopewell Junction, NY (US); Emily Wise, Beacon, NY (US); John R. Dangler, Rochester, MN (US); Kevin Randolph, Wurtsboro, NY (US); Andrew C.M. Hicks, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/621,538

(22) Filed: Mar. 29, 2024

(51) Int. Cl.
*G06F 11/3668* (2025.01)
*G06F 11/263* (2006.01)
*G06F 11/362* (2025.01)

(52) U.S. Cl.
CPC ........ *G06F 11/3688* (2013.01); *G06F 11/263* (2013.01); *G06F 11/366* (2013.01); *G06F 11/3692* (2013.01)

(58) Field of Classification Search
CPC ...... G06F 11/26; G06F 11/263; G06F 11/366; G06F 11/3688; G06F 11/3692
See application file for complete search history.

(56) References Cited

U.S. PATENT DOCUMENTS

| | | | |
|---|---|---|---|
| 9,529,036 B2 | 12/2016 | Balog | |
| 10,078,578 B2* | 9/2018 | Adinarayan | G06F 11/368 |
| 10,127,134 B2* | 11/2018 | Jayaraman | G06F 11/3698 |
| 10,289,539 B1* | 5/2019 | Arguelles | G06F 11/3698 |
| 10,430,263 B2 | 10/2019 | Polar Seminario | |
| 10,545,857 B2* | 1/2020 | Tammariello | H04L 43/50 |
| 11,386,075 B2 | 7/2022 | Schierz | |
| 11,567,824 B2 | 1/2023 | Saha | |
| 11,720,482 B1* | 8/2023 | Chauhan | G06F 11/3692 717/124 |

(Continued)

FOREIGN PATENT DOCUMENTS

CN 102597964 B 7/2015

OTHER PUBLICATIONS

"Parallelizing Tests With Pessimistic Speculative Execution," Feb. 22, 2019, 5 pages, IPCOM000257593D, IP.com.

(Continued)

*Primary Examiner* — Joseph R Kudirka
(74) *Attorney, Agent, or Firm* — CANTOR COLBURN LLP; Randy Emilio Tejeda

(57) ABSTRACT

In accordance with a technique of parallelized computer system testing, a processor develops, on a representative computer system, a plurality of groups of system tests based on test-ordering constraints, where the system tests in each of the plurality of groups are executable in a temporally overlapping manner. The processor applies a test suite including a sequence of multiple of the plurality of groups of system tests to a production computer system. Applying the test suite includes performing the system tests in each of multiple of the plurality of tests groups in a temporally overlapping manner, such that testing efficiency is improved.

20 Claims, 4 Drawing Sheets

(56) References Cited

U.S. PATENT DOCUMENTS

2020/0310779 A1\* 10/2020 Van Heuklon ............ G06F 8/65
2022/0035728 A1    2/2022 Muras

OTHER PUBLICATIONS

"Test Automation Scheduling Optimization," Jan. 24, 2017, 7 pages, IPCOM000248967D, IP.com.
Wang, F. et al., "A Novel Discrete Fruit Fly Optimization Algorithm for Intelligent Parallel Test Sheets Generation," Jul. 9, 2015, 6 pages, MATEC Web of Conferences 22, 01040.
Anonymous, "The Benefits of Parallel Testing", SAUCELABS, White Paper, 2020, 12 pages.

\* cited by examiner

COMPUTER SYSTEM TEST PARALLELIZATION

BACKGROUND OF THE INVENTION

The present invention relates in general to data processing, and more specifically, to testing data processing systems. Still more particularly, the present invention relates to the optimization of computer system tests through test parallelization.

Before an enterprise-class computer system purchased by a customer is approved for deployment, the manufacturer of the computer system often qualifies the computer as ready for deployment by performing a series of system tests on the hardware and firmware of the system. In a typical case, the system tests are performed sequentially one at a time, and all of the system tests must all be passed for the computer system to be qualified for deployment.

SUMMARY OF THE INVENTION

The present application appreciates that as computer systems become more complex, the number of system tests to be performed on system hardware and firmware prior to deployment increases. Performing these system tests sequentially can therefore consume substantial time and valuable production area in the manufacturing and/or testing facility. The present application therefore appreciates that it would be useful and desirable to accelerate system testing through testing parallelization.

In at least one embodiment, in accordance with a technique of parallelized computer system testing, a processor develops, on a representative computer system, a plurality of groups of system tests based on test-ordering constraints, where the system tests in each of the plurality of groups are executable in a temporally overlapping manner. The processor applies a test suite including a sequence of multiple of the plurality of groups of system tests to a production computer system. Applying the test suite includes performing the system tests in each of multiple of the plurality of tests groups in a temporally overlapping manner, such that testing efficiency is improved.

Figure 1:
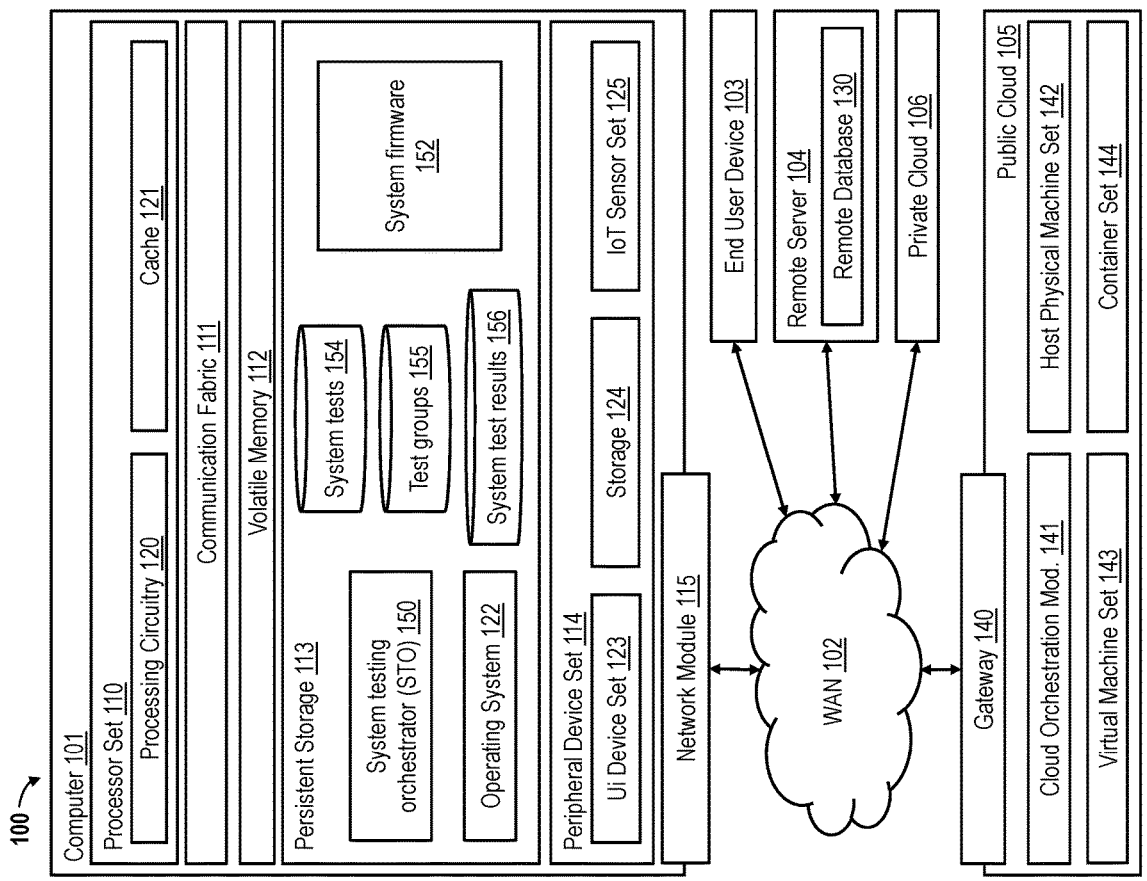
FIG. 1 is a high-level block diagram of an exemplary data processing environment in accordance with one or more embodiments.

In accordance with common practice, various features illustrated in the drawings may not be drawn to scale. Accordingly, dimensions of the various features may be arbitrarily expanded or reduced for clarity. In addition, some of the drawings may not depict all of the components of a given system, method, or device. Finally, like reference numerals may be used to denote like or corresponding features in the specification and figures.

DETAILED DESCRIPTION OF ILLUSTRATIVE EMBODIMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as system testing orchestrator (STO) 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122, STO 150, and system firmware 152, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be implemented in STO 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet-of-Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the Internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Those of ordinary skill in the art will appreciate that the architecture and components of a data processing environment can vary between embodiments. Accordingly, the exemplary computing environment 100 given in FIG. 1 is not meant to imply architectural limitations with respect to the claimed invention.

Figure 2:
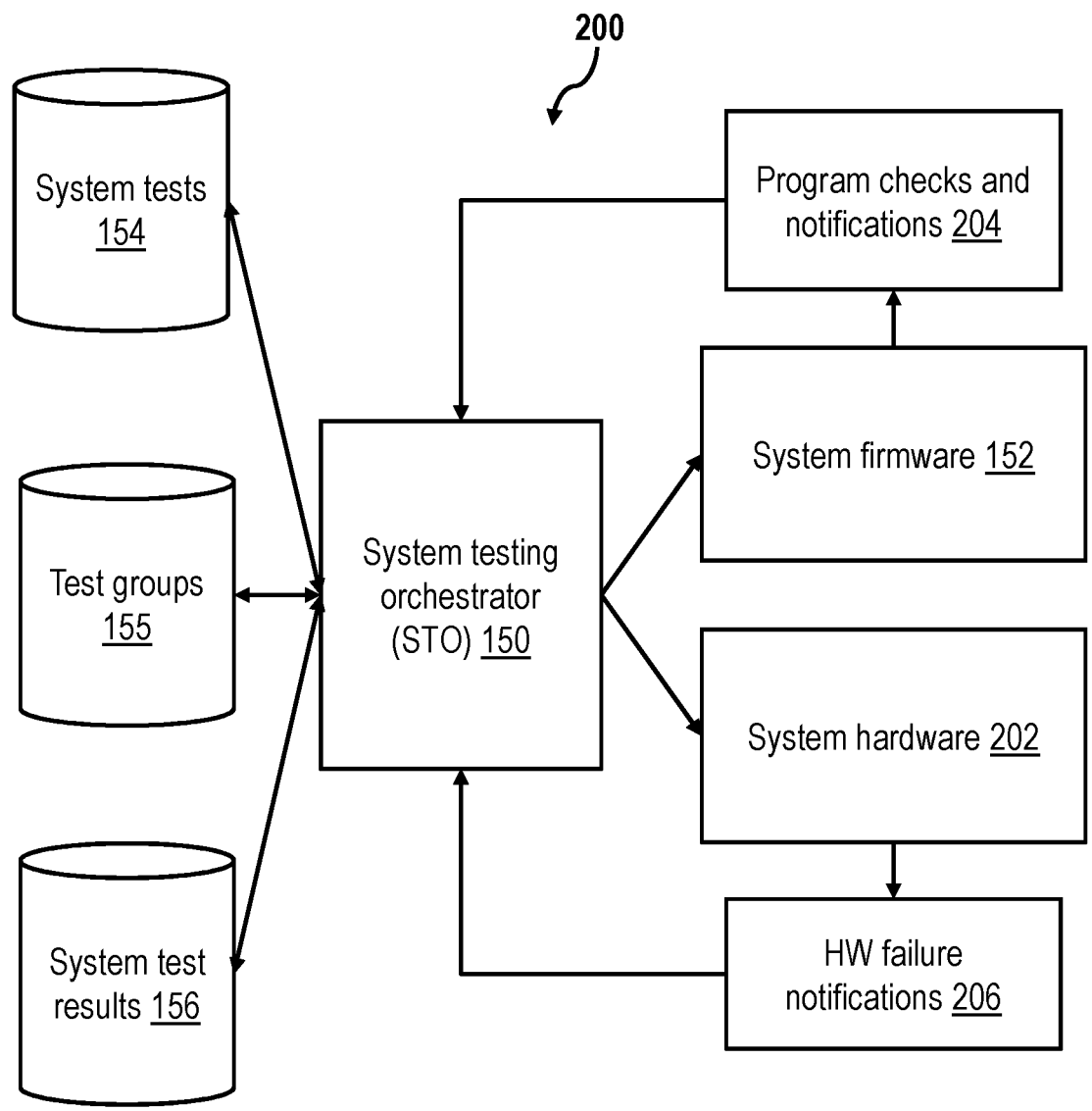
FIG. 2 illustrates an exemplary system testing architecture in accordance with one embodiment.

Referring now to FIG. 2, there is illustrated an exemplary system testing architecture 200 in accordance with one embodiment. In exemplary system testing architecture 200, system testing orchestrator (STO) 150, which may execute on a computer system under test or another computer system in computing environment 100, applies a test suite of multiple system tests 154 (which can be stored in persistent storage 113 or elsewhere in computing environment 100) to the computer system under test to verify the presence or absence of defects in the computer system under test. As indicated in FIG. 2, STO 150 may apply system tests 154 in the test suite to system firmware 152 and/or system hardware 202 of the computer system under test. In accordance with one aspect of the disclosed embodiments, STO 150 optimizes testing by applying at least some of the system tests in the test suite in parallel as a test group 155, that is, in a temporally overlapping manner. As a result, the overall runtime of system testing can be reduced.

If one or more of the system tests 154 discover a defect in system firmware 152, system firmware 152 may notify STO 150 through issuing program checks. In at least some embodiments, these program checks, if any, are received by operating system 122 and reported to STO 150 in one or more program check notifications. Program checks and associated program check notifications are collectively illustrated at block 204. Similarly, if a system test 152 exposes a defect in system hardware 202, system hardware 202 and/or program code, such as system firmware 152 or operating system 122, may generate a hardware failure notification 206 identifying a component of system hardware 202 having the defect. STO 150 records the results of the system tests 154 applied to the computer system under test, including, among other data, the execution time of each applied system test 152 and any associated program checks and notifications 204 and/or hardware failure notifications 206, in system test results 152. In general, STO 150 determines that the computer system under test passes the suite of applied system tests 154 if no program check notifications 204 and no hardware failure notifications 206 are generated by the computer system under test as a result of the testing.

Figure 3:
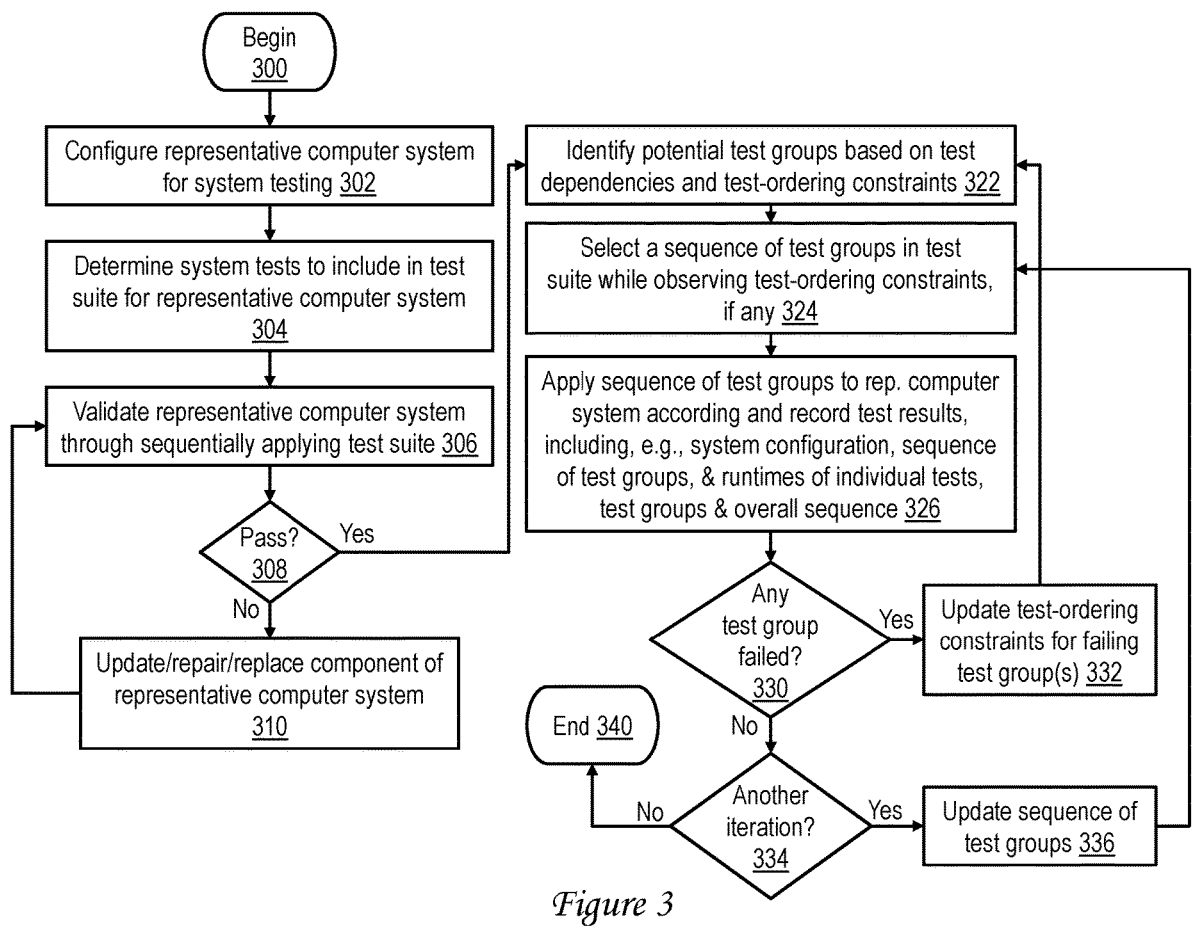
FIG. 3 is a high-level block diagram of an exemplary process of developing test groups for performing system testing on a computer system in accordance with one or more embodiments.

With reference now to FIG. 3, there is illustrated a high-level block diagram of an exemplary process of developing test groups for performing system testing on a computer system in accordance with one or more embodiments.

The process of FIG. 3 begins at block 300 and then proceeds to block 302, which illustrates the configuration of a representative computer system for system testing. A testing team preferably configures the representative computer system with selected system firmware 152 and selected system hardware 202 representative of that present in a production computer system intended to be deployed by the computer system manufacturer at a customer site. In some implementations, system firmware 152 and system hardware 202 present in the representative computer system are those in a most common commercial configuration of the computer system; in other implementations, the system firmware 152 and system hardware 202 present in the representative computer system are a superset of those that would be present in commercial configurations of the computer system.

At block 304, STO 150, which can execute on the representative computer system and/or another computer system in computing environment 100, audits the representative computer system and identifies a comprehensive component list detailing the system firmware 152 and system hardware 202 present in the representative computer system. Based on the comprehensive component list, STO 150 additionally determines at block 304 a subset of system tests 154 to include in a test suite that would be adequate to detect defects, if any, present in system firmware 152 and/or system hardware 202.

At block 306, STO 150 validates the representative computer system through sequentially applying each of the system tests 154 comprising the test suite one at a time to the representative computer system and recording the system test results 152 (including any program check notifications 204 and/or hardware failure notifications). As will be appreciated, the sequential application of system tests 154 is not intended to obtain an optimized testing schedule, but is instead intended to determine whether or not the representative computer system is free from defects in advance of determining which of system tests 154 can be grouped for temporally overlapping execution. STO 150 then determines by reference to system test results 156 whether the representative computer system passed all the system tests 154 in the test suite (block 308). If so, the process proceeds to block 322, which is described below. If, however, STO 150 determines at block 308 that the representative computer system failed at least one system test 154 in the test suite, the process passes to block 310, which illustrates the testing team updating, repairing, and/or replacing a component of system firmware 152 or system hardware 202 in order to correct the defect(s) discovered by the sequential system testing performed at block 306. Following block 310, the process of FIG. 3 returns to block 306, which represents STO 150 again performing sequential system testing on the representative computer system to verify that the corrective action taken at block 310 has corrected all defects in the representative computer system.

Referring now to block 322, STO 150 identifies potential test groups comprising multiple system tests 154 that are executable in parallel (i.e., in a temporally overlapping manner). In at least some embodiments, STO 150 identifies these potential test groups based at least in part on any resource dependencies and/or data dependencies between system tests 154 included in the test suite utilized to validate the representative computer system. A resource dependency is a dependency that serializes a particular system test 154 with respect to one or more other system tests 154 based on the particular system test 154 requiring access to the same resource (e.g., a firmware or hardware component) within the representative computer system as the other system test(s) 154. A data dependency is a dependency that at least partially serializes a particular system test 154 with respect to one or more other system tests 154 due to the particular system test 154 receiving, as input(s), one or more outputs of the other system test(s) 152. STO 150 can identify the dependencies, for example, by comparing resources accessed by the system tests 154 comprising the test suite and data sets generated and consumed by the system tests 154 in the test suite. At block 322, STO 150 generates a set of test-ordering constraints based on the identified dependencies. The test-ordering constraints preferably indicate (either explicitly or implicitly) any necessary ordering of the system tests 154 and system tests 154 precluded from running in a temporally overlapping manner (i.e., in parallel). STO 150 can then record the test groups 155 (i.e., the system tests 154 that are executable in parallel), for example, in persistent storage 113 or elsewhere in computing environment 100.

Based on system tests 154 included in the test suite and the test-ordering constraints generated at block 322, STO 150 automatically selects a sequence in which the test groups 155 including the system tests 154 comprising the test suite are to be executed (block 324). Again, STO 150 observes test-ordering constraints while determining the sequence of the test groups 155. At block 326, STO 150 applies the test suite to the representative computer system according to the sequence of test groups determined at block 324 and records the system test results 156. In at least one embodiment, the system test results 156 include the system configuration, the sequence of test groups 155, the runtimes of each individual system tests 154 in the test suite and each test group 155, and an overall test suite runtime.

STO 150 then determines whether system test results 156 indicate that all system tests 154 in the test suite were able to complete execution successfully or whether any test group 155 failed (block 330). In response to a determination at block 330 that at least one test group 155 failed, STO 150 updates the test-ordering constraints for one or more system tests 154 to resolve any resource and/or data dependency between system tests 154 that prevented the test suite from running successfully (block 332). The process then returns to block 322, which has been described. Returning to block 330, in response to STO 150 determining that that the test suite completed successfully, the process proceeds to block 334, which illustrates STO 150 determining whether or not to attempt to further optimize the execution time of the test suite by modifying the sequence of test groups 155 included in the test suite. STO 150 can make the determination shown at block 334, for example, based on a configurable minimum number of iterations, based on an improvement in the execution time of the test suite achieved by a prior iteration of test suite execution, and/or a prospective improvement in the execution time of the test suite expected to be achieved by another iteration of test suite. In response to an affirmative determination at block 334, STO 150 updates (modifies) the sequence of test groups in an attempt to further reduce the execution time of the test suite (block 336). Following block 336, the process returns to block 324 and proceeds iteratively. In response to a negative determination at block 334, the process of FIG. 3 ends at block 340.

When the process of FIG. 3 ends, STO 150 has obtained at least one sequence of test groups 155 in the test suite for the representative computer system. The test suite and its constituent sequence of test groups 155 can now be utilized to efficiently test production computer systems intended for deployment to customers, as described with reference to FIG. 4. As will be appreciated, the process of FIG. 3 can be performed multiple times to generate one or more sequences of test groups for each of multiple test suites for performing system testing on one or more computer system configurations.

Figure 4:
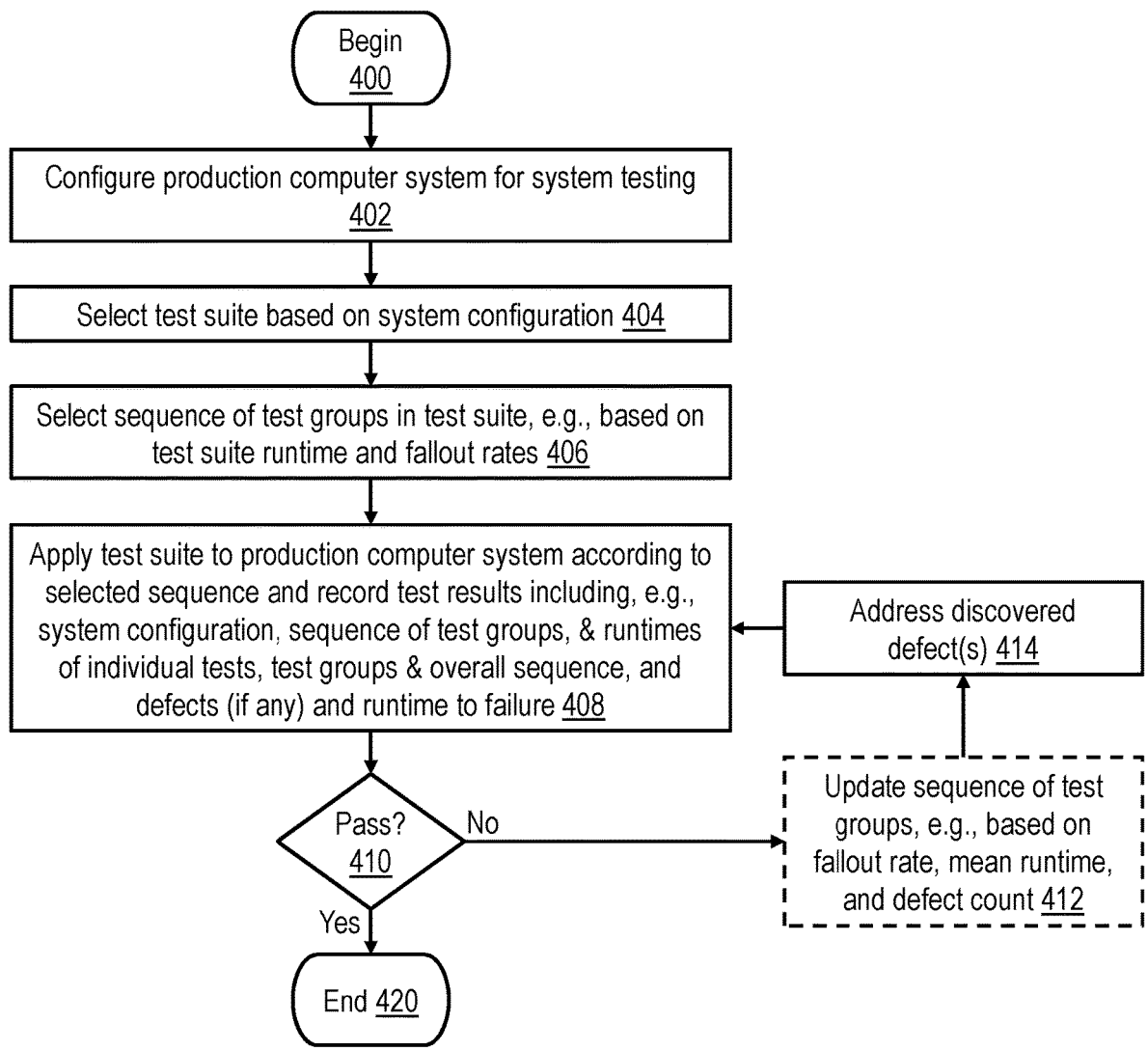
FIG. 4 is a high-level block diagram of an exemplary process of performing parallelized system testing on a production computer system in accordance with one or more embodiments.

Referring now to FIG. 4, there is depicted a high-level block diagram of an exemplary process of performing parallelized system testing on a production computer system in accordance with one or more embodiments. The process of FIG. 4 begins at block 400 and then proceeds to block 402, which depicts a testing team configuring a production computer system intended for deployment to a customer site for system testing. In a typical implementation, the testing team configures the production computer system with system hardware 202 and system firmware 152 similar or identical to that installed in a previously tested representative computer system. At block 404, STO 150, which can execute on the production computer system under test and/or another computer system in computing environment 100, determines a system configuration of the production computer system. In some embodiments, STO 150 can determine the system configuration by auditing the production computer system and building a comprehensive component list detailing the system firmware 152 and system hardware 202 present in the production computer system. In other embodiments, STO 150 can determine the system configuration, for example, by reading the system configuration from data storage (e.g., a configuration register) in the production computer system. STO 150 then selects a test suite suitable for performing system testing on a computer system having the system configuration determined at block 402 (block 404). As depicted at block 406, STO 150 selects a sequence for the test groups comprising the test suite from among those recorded in system test results 156. STO 150 may make the selection of the sequence of test groups comprising the test suite based on one or more criteria, including, for example, the overall runtime of the test suite utilizing the sequence of test groups, mean fallout rates (i.e., mean rate of failure of systems tested by the test suite in accordance with the selected sequence), and mean runtimes to failure (i.e., the mean elapsed testing time to test suite failure utilizing the selected sequence). It will be appreciated by those skilled in the art that STO 150 may be configured to optimize selection of the sequence of the test groups comprising the test suite based on different weightings of the selection criteria at different points in a product production cycle. Thus, at some points in the product production cycle, STO 150 may weigh overall runtime of the test suite more heavily relative to other criteria when selecting the sequence of test groups, while at other times, STO 150 may weigh the mean runtime to failure more heavily when selecting the sequence of test groups.

At block 408, STO 150 applies the selected test suite to the production computer system according to the sequence of test groups selected at block 406 and records the system test results 156. In at least one embodiment, the system test results 156 include the system configuration, the sequence of test groups forming the test suite, the runtimes of each individual system test 152 in the test suite, each test group, and the overall test suite, and the defects, if any, detected, in the production computer system, and if applicable, the runtime until failure. STO 150 then determines at block 410 whether or not the production computer system passed the test suite, that is, whether the production computer system passed all of the system tests 154 within the test suite.

In some embodiments, the process passes directly from block 410 to block 414 in response to a negative determination at block 410. In other embodiments, in response to a negative determination at block 410, the process passes to optional block 412, which illustrates STO 150 updating the sequence of the test groups comprising the test suite, for example, based on the fallout rate, runtime until failure, and defect count for the most recent test run of the test suite. In general, STO 150 may update the sequence of test groups to increase the fallout rate, to reduce the runtime to failure, and/or to increase the defect count. The testing team additionally addresses the defect(s) detected in the production computer system, for example, by repair, replacement, or upgrade of the failed component(s) of the production computer system (block 414). Following block 414, the process returns to block 408 and proceeds iteratively.

Referring again to block 410, in response to STO 150 determining that the production computer system passed the test suite (and thus is ready for deployment to a customer site), the process of FIG. 4 ends at block 420.

As has been described, in accordance with a technique of parallelized computer system testing, a processor develops, on a representative computer system, a plurality of groups of system tests based on test-ordering constraints, where the system tests in each of the plurality of groups are executable in a temporally overlapping manner. The processor applies a test suite including a sequence of multiple of the plurality of groups of system tests to a production computer system. Applying the test suite includes performing the system tests in each of multiple of the plurality of tests groups in a temporally overlapping manner, such that testing efficiency is improved.

The present invention may be implemented as a method, a system, and/or a computer program product. The computer program product may include a storage device having computer-readable program instructions (program code) thereon for causing a processor to carry out aspects of the present invention. As employed herein, a "storage device" is specifically defined to include only statutory articles of manufacture and to exclude signal media per se, transitory propagating signals per se, and energy per se.

Aspects of the present invention are described herein with reference to flowchart illustrations and/or block diagrams that illustrate the architecture, functionality, and operation of possible implementations of systems, methods, and computer program products according to various embodiments. It will be understood that each block of the block diagrams and/or flowcharts and combinations of blocks in the block diagrams and/or flowcharts can be implemented by special purpose hardware-based systems and/or program code that perform the specified functions. While the present invention has been particularly shown as described with reference to one or more preferred embodiments, it will be understood by those skilled in the art that various changes in form and detail may be made therein without departing from the spirit and scope of the invention.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms and that multiple of the disclosed embodiments can be combined. Lastly, the use of a singular term, such as, but not limited to, "a" is not intended as limiting of the number of items.

What is claimed is:

1. A method of data processing in a data processing system including a processor, the method comprising:
the processor developing, on a representative computer system, a plurality of groups of system tests based on test-ordering constraints, wherein the system tests in each of the plurality of groups are executable in a temporally overlapping manner;
persistently storing, by the processor, the plurality of groups and a sequence for execution of the groups, the plurality of groups being generated on the representative computer system; and
applying, by the processor, a test suite including a sequence of multiple of the plurality of groups of system tests to a production computer system, wherein the applying comprises executing the system tests in each of multiple of the plurality of groups in a temporally overlapping manner, strictly according to the sequence specified in the plurality of groups.

2. The method of claim 1, further comprising:
the processor validating the representative computer system through sequential execution of individual system tests forming one of the plurality of groups.

3. The method of claim 1, wherein the test-ordering constraints include at least one of the following set:
resource constraints; and
data dependency constraints.

4. The method of claim 1, further comprising:
the processor selecting the test suite for application to the production computer system based on a configuration specified by the production computer system.

5. The method of claim 4, further comprising:
the processor selecting the sequence of the multiple groups of system tests forming the test suite from among multiple different sequences based at least on a fallout rate for the selected sequence.

6. The method of claim 1, further comprising:
the processor updating the sequence based on the test suite discovering a defect in the production computer system.

7. The method of claim 1, wherein selecting the sequence of the plurality of groups of system tests for application to the production computer system comprises weighting selection criteria based on a stage of a product production cycle, the selection criteria including at least one of overall runtime of the test suite, mean fallout rate, and mean runtime to failure.

8. The method of claim 7, wherein during an initial stage of the product production cycle, the processor selects the sequence of the plurality of groups of system tests by weighting the overall runtime of the test suite more heavily than the mean runtime to failure.

9. A program product, comprising:
a non-transitory computer-readable storage medium; and
program code stored within the non-transitory computer-readable storage medium and executable by processing circuitry of a data processing system to cause the data processing system to perform:
developing, on a representative computer system, a plurality of groups of system tests based on test-ordering constraints, wherein the system tests in each of the plurality of groups are executable in a temporally overlapping manner;
persistently storing the plurality of groups and a sequence for execution of the groups, the plurality of groups being generated on the representative computer system; and
applying a test suite including a sequence of multiple of the plurality of groups of system tests to a production computer system, wherein the applying comprises executing the system tests in each of multiple of the plurality of groups in a temporally overlapping manner, strictly according to the sequence specified in the plurality of groups.

10. The program product of claim 9, wherein the program code, when executed, further causes the data processing system to perform:
validating the representative computer system through sequential execution of a plurality of individual system tests forming one of the plurality of groups.

11. The program product of claim 9, wherein the test-ordering constraints include at least one of the following set:
resource constraints; and
data dependency constraints.

12. The program product of claim 9, wherein the program code, when executed, further causes the data processing system to perform:
selecting the test suite for application to the production computer system based on a configuration specified by the production computer system.

13. The program product of claim 12, wherein the program code, when executed, further causes the data processing system to perform:
selecting the sequence of the multiple groups of system tests forming the test suite from among multiple different sequences based at least on a fallout rate for the selected sequence.

14. The program product of claim 9, wherein the program code, when executed, further causes the data processing system to perform:
  updating the sequence based on the test suite discovering a defect in the production computer system.

15. A data processing system, comprising:
  processing circuitry;
  a storage device communicatively coupled to the processing circuitry; and
  program code stored within the storage device and executable by the processing circuitry of the data processing system to cause the data processing system to perform:
    developing, on a representative computer system, a plurality of groups of system tests based on test-ordering constraints, wherein the system tests in each of the plurality of groups are executable in a temporally overlapping manner;
    persistently storing the plurality of groups and a sequence for execution of the groups, the plurality of groups being generated on the representative computer system; and
    applying a test suite including a sequence of multiple of the plurality of groups of system tests to a production computer system, wherein the applying comprises executing the system tests in each of multiple of the plurality of groups in a temporally overlapping manner, strictly according to the sequence specified in the plurality of groups.

16. The data processing system of claim 15, wherein the program code, when executed, further causes the data processing system to perform:
  validating the representative computer system through sequential execution of a plurality of individual system tests forming one of the plurality of groups.

17. The data processing system of claim 15, wherein the test-ordering constraints include at least one of the following set:
  resource constraints; and
  data dependency constraints.

18. The data processing system of claim 15, wherein the program code, when executed, further causes the data processing system to perform:
  selecting the test suite for application to the production computer system based on a configuration specified by the production computer system.

19. The data processing system of claim 18, wherein the program code, when executed, further causes the data processing system to perform:
  selecting the sequence of the multiple groups of system tests forming the test suite from among multiple different sequences based at least on a fallout rate for the selected sequence.

20. The data processing system of claim 15, wherein the program code, when executed, further causes the data processing system to perform:
  updating the sequence based on the test suite discovering a defect in the production computer system.

\* \* \* \* \*